United States Patent
Kim et al.

(10) Patent No.: US 12,512,011 B2
(45) Date of Patent: Dec. 30, 2025

(54) DRIVING SIMULATOR FOR ACCIDENT ANALYSIS OF AUTONOMOUS EMERGENCY BRAKING DEVICE

(71) Applicant: REPUBLIC OF KOREA (NATIONAL FORENSIC SERVICE DIRECTOR MINISTRY OF PUBLIC ADMINISTRATION AND SECURITY), Seoul (KR)

(72) Inventors: Jonghyuk Kim, Gangwon-do (KR); Jihun Choi, Gangwon-do (KR); Hyunseo Han, Gangwon-do (KR); Jungwoo Park, Gangwon-do (KR); Hasun Park, Gangwon-do (KR)

(73) Assignee: REPUBLIC OF KOREA (NATIONAL FORENSIC SERVICE DIRECTOR MINISTRY OF PUBLIC ADMINISTRATION & SECURITY), Seoul (KR)

( * ) Notice: Subject to any disclaimer, the term of this patent is extended or adjusted under 35 U.S.C. 154(b) by 758 days.

(21) Appl. No.: 17/937,811

(22) Filed: Oct. 4, 2022

(65) Prior Publication Data
US 2023/0351911 A1 Nov. 2, 2023

(30) Foreign Application Priority Data
Apr. 28, 2022 (KR) .................. 10-2022-0052873

(51) Int. Cl.
*G09B 9/02* (2006.01)
*G01S 13/86* (2006.01)
*G01S 13/931* (2020.01)

(52) U.S. Cl.
CPC .............. *G09B 9/02* (2013.01); *G01S 13/867* (2013.01); *G01S 13/931* (2013.01)

(58) Field of Classification Search
CPC ........ G09B 9/02; G01S 13/867; G01S 13/931
See application file for complete search history.

(56) References Cited

U.S. PATENT DOCUMENTS

2017/0039871 A1* 2/2017 Harkness ............... G09B 9/052
2017/0285639 A1 10/2017 Jones et al.
(Continued)

FOREIGN PATENT DOCUMENTS

| CN | 113870648 | 12/2021 |
| KR | 101357596 | 2/2014 |
| KR | 102011664 | 8/2019 |

OTHER PUBLICATIONS

Rimini-Doering, Maria, et al. "Effects of lane departure warning on drowsy drivers' performance and state in a simulator." Driving Assessment Conference. vol. 3. No. 2005. University of Iowa, 2005. (Year: 2005).*

(Continued)

*Primary Examiner* — Chuen-Meei Gan
(74) *Attorney, Agent, or Firm* — Perman & Green, LLP

(57) ABSTRACT

The disclosure relates to a driving simulator for accident analysis of an autonomous emergency braking device, the driving simulator including a boarding unit including a boarding display unit, a main body, and a support unit, and a control unit including a controller configured to run a simulation program for accident analysis of the autonomous emergency braking device and control the boarding unit, and a control display unit configured to provide an operator interface screen of a simulation program for accident analysis of the autonomous emergency braking device, wherein the simulation program for accident analysis of the autonomous emergency braking device includes an autonomous emergency braking driving logic unit configured to output a warning signal to the boarding unit according to a sequence (Continued)

of the autonomous emergency braking device or apply a virtual braking pressure to the virtual driving vehicle, calculate collision data.

8 Claims, 9 Drawing Sheets

(56) References Cited

U.S. PATENT DOCUMENTS

2017/0372431 A1* 12/2017 Perl ..................... G06Q 10/047
2022/0065644 A1* 3/2022 Kundu ............... G01C 21/3446

OTHER PUBLICATIONS

Kim, Taewoo, et al. "Safety assessment procedure for advanced emergency braking system." 24th International Technical Conference on the Enhanced Safety of Vehicles (ESV). 2015. (Year: 2015).*

Daeryong Ahn et al., "Control Performance Parameter Analysis of Simulation Based Cyclist-AEB System," Main Research Institute: Korea Automotive Technology Institute, Publisher: The Korean Society of Automotive Engineers 2016 Fall Conference (May 31, 2016).

Seryong Baek et al., "Development of AEBS Simulation Model for Traffic Accident Analysis of Vehicle with ADAS," Main Research Institute: Gacheon Samsong Automotive Research Center/National Forensic Service/Gacheon University, Publisher: The Korean Society of Automotive Engineers vol. 29, No. 11. pp. 995-1001, (Published Nov. 30, 2021).

Jonghyuk Kim et al., "Establishment of an Autonomous Emergency Braking System's Simulation Environment Based on Driving Simulator," Main Research Institute: National Forensic Service, Publisher: The Korean Society Automotive Engineers 2021 Fall Conference, (Published Nov. 17, 2021).

Jonghyuk Kim et al., "A Study on the AEB Operation Simulation Using Prescan Based on the Vehicle Test," Main Research Institute: National Forensic Service, Publisher: The Korean Society Automotive Engineers (Published Mar. 2022), vol. 30, No. 3, pp. 249-257.

* cited by examiner

DRIVING SIMULATOR FOR ACCIDENT ANALYSIS OF AUTONOMOUS EMERGENCY BRAKING DEVICE

CROSS-REFERENCE TO RELATED APPLICATION

This application is based on and claims priority under 35 U.S.C. § 119 to Korean Patent Application No. 10-2022-0052873, filed on Apr. 28, 2022, in the Korean Intellectual Property Office, the disclosure of which is incorporated by reference herein in its entirety.

BACKGROUND

1. Field

The disclosure relates to driving simulators for accident analysis of an autonomous emergency braking device, and more particularly, to driving simulators for accident analysis of an autonomous emergency braking device to which actual test data and radar characteristics of the autonomous emergency braking device are input.

2. Description of the Related Art

In general, an Advanced Driver Assistance System (ADAS) includes an Autonomous Emergency Braking (AEB) system by which a vehicle system recognizes an emergency situation and controls a braking system to generate a braking force.

When an advanced driver assistance system recognizes an object in front of a vehicle, a relative distance, a relative speed, and azimuth to the object are measured to determine whether the autonomous emergency braking device operates or not. The autonomous emergency braking device generates braking pressure by transmitting hydraulic pressure to a brake caliper in an autonomous emergency braking situation.

When the autonomous emergency braking device operates, a collision warning signal is output, and thereafter, a partial braking operation in which a deceleration of about 0.2 G occurs and a full braking operation in which a deceleration of about 1.0 G occurs are sequentially performed. The partial braking operation may be omitted. The entry point of each stage is determined based on a relative speed and time to collision.

SUMMARY

When a problem occurs in a vehicle equipped with an advanced driver assistance system including an autonomous emergency braking device, it is necessary to determine the limitations of function or performance of the advanced driver assistance system, the driver's negligence, and whether the emergency braking device properly operates. Therefore, in order to analyze and reproduce an accident of a vehicle equipped with an advanced driver assistance system including an emergency braking device, a driving simulator for simulating the operation of the emergency braking device is needed.

To solve various problems including the above problems, the present disclosure provides a driving simulator for accident analysis of an autonomous emergency braking device. However, these technical problems are just examples, and the scope of the present disclosure is not limited thereto.

Additional aspects will be set forth in part in the description which follows and, in part, will be apparent from the description, or may be learned by practice of the presented embodiments of the disclosure.

According to an aspect of an embodiment, a driving simulator for accident analysis of an autonomous emergency braking device, the driving simulator includes a boarding unit including a boarding display unit providing a virtual driving image, a main body where a passenger boards and operates a virtual driving vehicle, and a support unit for supporting the boarding display unit and the main body, and a control unit including: a controller configured to run a simulation program for accident analysis of the autonomous emergency braking device and controls the boarding unit, and a control display unit configured to provide an operator interface screen of a simulation program for accident analysis of the autonomous emergency braking device, wherein the simulation program for accident analysis of the autonomous emergency braking device includes an autonomous emergency braking driving logic unit configured to output a warning signal to the boarding unit according to a sequence of the autonomous emergency braking device or apply a virtual braking pressure to the virtual driving vehicle, calculate collision data including a final stopping distance and a collision speed, and display the collision data on the control display unit.

In an embodiment, the simulation program for accident analysis of the autonomous emergency braking device may further include a radar driving logic unit configured to acquire a first radar sensor signal, a second radar sensor signal, and a camera sensor signal from virtual driving data including state data of the virtual driving vehicle, a target, and a driving environment, acquires first fusion data and second fusion data by combining each of the first radar sensor signal and the second radar sensor signal with the camera sensor signal, and calculates a relative speed, a relative distance, and an azimuth between the driving vehicle and the target based on the first fusion data and the second fusion data.

In an embodiment, the radar driving logic unit may include radar sensor characteristic data according to the vehicle type of the virtual driving vehicle.

In an embodiment, the autonomous emergency braking driving logic unit may calculate a time to collision from the relative speed, the relative distance, and the azimuth, and compare the relative speed and the time to collision with actual test data of the autonomous emergency braking device.

In an embodiment, the autonomous emergency braking driving logic unit may include actual test data of the autonomous emergency braking device for a plurality of vehicle types, and select actual test data of the autonomous emergency braking device corresponding to the vehicle type of the virtual driving vehicle, and the actual test data of the autonomous emergency braking device may include a value of time to collision according to a relative speed at which a warning operation, a partial braking operation, and a full braking operation are started, which are obtained through the actual test.

In an embodiment, the actual test data of the autonomous emergency braking device may include a performance requirement for a warning operation, a partial braking operation, and a full braking operation according to the relative speed obtained in the operation experiment with a stop target of an autonomous emergency braking device of a test vehicle equipped with a DGPS device and an inertial measurement unit (IMU) device.

In an embodiment, the simulation program for the accident analysis of the autonomous emergency braking device may output a warning signal to the boarding unit when the virtual driving vehicle satisfies the performance requirement for the warning operation.

In an embodiment, the boarding unit may further include an acoustic output device and an auxiliary display unit mounted on the main body, and the simulation program for the accident analysis of the autonomous emergency braking device may output an image warning signal to the auxiliary display unit, and output a warning signal sound to the sound output device.

In an embodiment, the boarding unit may further include a data acquisition device for recording a reaction of the passenger and transmitting the recorded data to the control unit.

In an embodiment, the boarding unit may further include a switch unit for the passenger to set a driving mode of the virtual driving vehicle and whether to operate the autonomous emergency braking device.

In an embodiment, the boarding display unit may include a central display device attached to the front of the passenger and a first side display device and a second side display device respectively attached to both sides of the central display device.

In an embodiment, the main body may include a steering device, a pedal, a gear, and a side brake.

Other aspects, features and advantages other than those described above will become apparent from the following drawings, claims, and detailed description of the invention.

These general and specific aspects may be implemented by using a system, method, computer program, or any combination of systems, methods, and computer programs.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
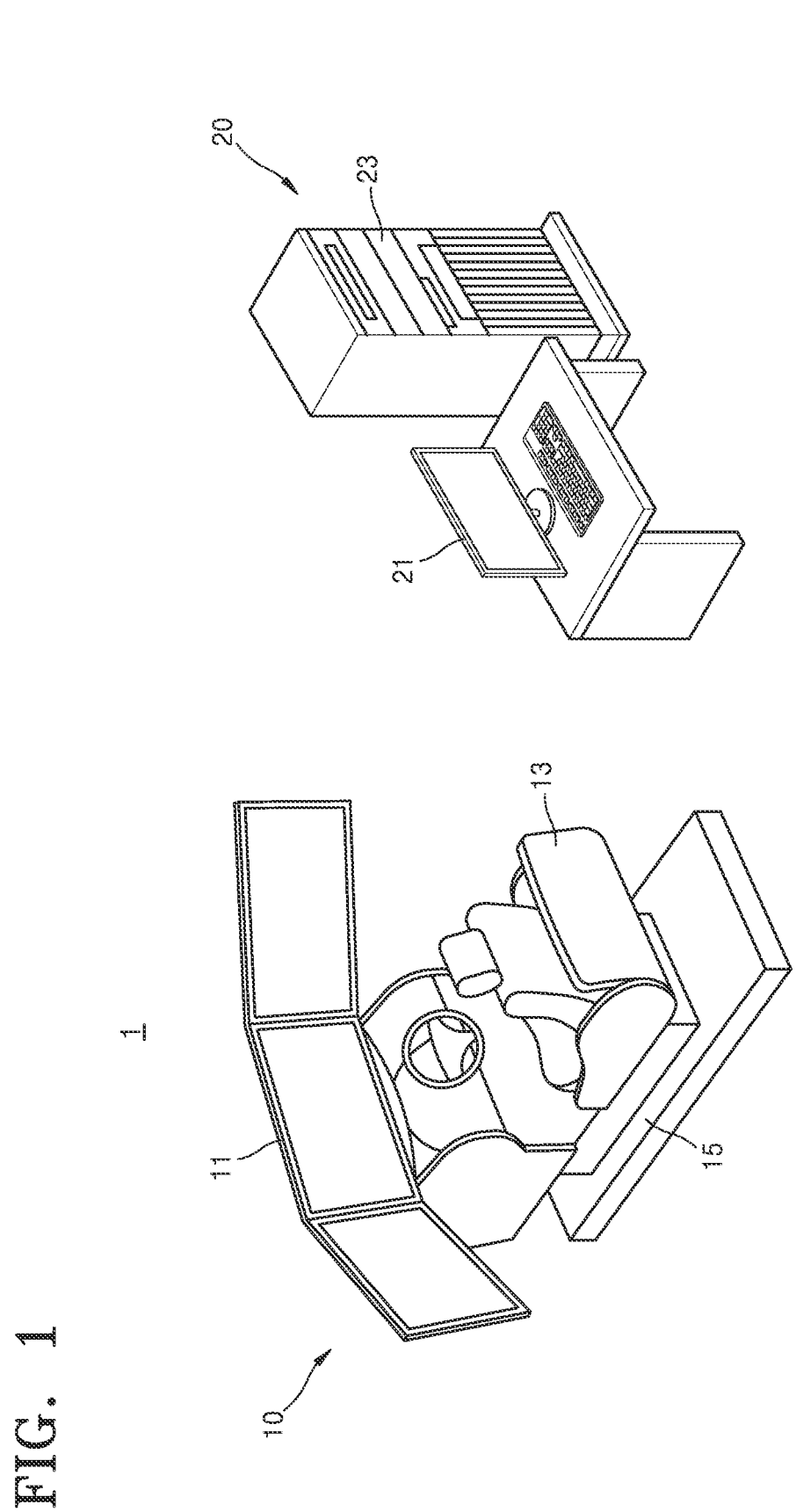
FIG. 1 is a schematic diagram illustrating a driving simulator for analyzing an accident of an autonomous emergency braking device according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The disclosure may be modified into various forms and may have various embodiments. In this regards, the disclosure will now be made in detail to embodiments, examples of which are illustrated in the accompanying drawings. The advantages, features, and methods of achieving the advantages may be clear when referring to the embodiments described below together with the drawings. However, the disclosure may have different forms and should not be construed as being limited to the descriptions set forth herein.

Hereafter, the disclosure will be described more fully with reference to the accompanying drawings, in which embodiments of the disclosure are shown. In describing the disclosure with reference to drawings, like reference numerals are used for elements that are substantially identical or correspond to each other, and the descriptions thereof will not be repeated.

It will be understood that, although the terms "first", "second", "third", etc., may be used herein to describe various elements, these elements should not be limited by these terms.

In the specification, As used herein, the singular forms are intended to include the plural forms as well, unless the context clearly indicates otherwise The terms "comprises" and/or "comprising," when used in this specification, specify the presence of stated features or constituent elements but do not preclude the presence or addition of one or more other features or constituent elements.

In the present specification, when a film, a region, a constituent element is referred to as being "on" or "above" another element, the film, the region, or the constituent element may be in direct contact with the other element or other intervening film, region, or constituent element may be present.

In the present specification, when a film, a region, a constituent element, etc. are connected, it may include a case when a film, a region, a constituent element is directly connected or/and a case when the film, the region, and the components are indirectly connected by intervening another film, a region, a constituent element therebetween. For example, in the present specification, when a film, a region, a constituent element, etc. are electrically connected, it may represent when a film, region, constituent element, etc. are directly electrically connected, and/or another film, region, component, etc. are indirectly electrically connected by intervening another film, region, constituent element, etc. therebetween.

In the present specification, "A and/or B" refers to A, B, or A and B. And, "at least one of A and B" represents a case of A, B, or A and B.

In the present specification, when a certain embodiment may be implemented differently, a specific process order may be performed differently from the described order. For example, two consecutively described processes may be performed substantially at the same time or performed in an order opposite to the described order.

In the present specification, some embodiments may be described as functional block configurations and various processing operations. Some or all of these functional blocks may be implemented in various numbers of hardware and/or software configurations that perform specific functions. For example, the functional blocks of the present specification may be implemented by one or more microprocessors, or may be implemented by circuit configurations for a given function.

The functional blocks of the present specification may be implemented in various programming or scripting languages. The functional blocks of the present specification may be implemented as an algorithm running on one or more processors. A function performed by a functional block in the present specification may be performed by a plurality of functional blocks, or functions performed by a plurality of functional blocks in the present specification may be performed by one functional block. In addition, the present specification may employ techniques of the related art for setting an electronic environment, signal processing, and/or data processing, and the like.

In the drawings, the sizes of components may be exaggerated or reduced for convenience of description. For example, the sizes and thicknesses of elements in the drawings are arbitrarily expressed for convenience of explanation, and thus, the current disclosure is not limited to the drawings.

FIG. 1 is a schematic diagram illustrating a driving simulator 1 for analyzing an accident of an autonomous emergency braking device according to an embodiment.

Referring to FIG. 1, the driving simulator 1 for analyzing an accident of an autonomous emergency braking device according to an embodiment may include a boarding unit 10 and a control unit 20.

The boarding unit 10 may include a boarding display unit 11, a main body 13, and a support unit 15. The boarding unit 10 may provide an environment similar to a case of driving an actual vehicle to a passenger, and may be a device for confirming a passenger's reaction in a virtual driving scenario.

The boarding display unit 11 may include at least one display device. In an embodiment, the boarding display unit 11 may include a plurality of display devices to provide an image similar to a field of view of the passenger when boarding the driver's seat of an actual vehicle. For example, the boarding display unit 11 may include a central display in front of the passenger, and a first side display and a second side display attached to side surfaces of the central display and inclined at a given angle toward the passenger. In an embodiment, the boarding display unit 11 may provide an image similar to a view of the passenger by using a curved display when the passenger sits on the driver's seat. The display included in the boarding display unit 11 may be a direct view type device, such as a monitor, or a projection type device for projecting an image on at least one screen.

Figure 2:
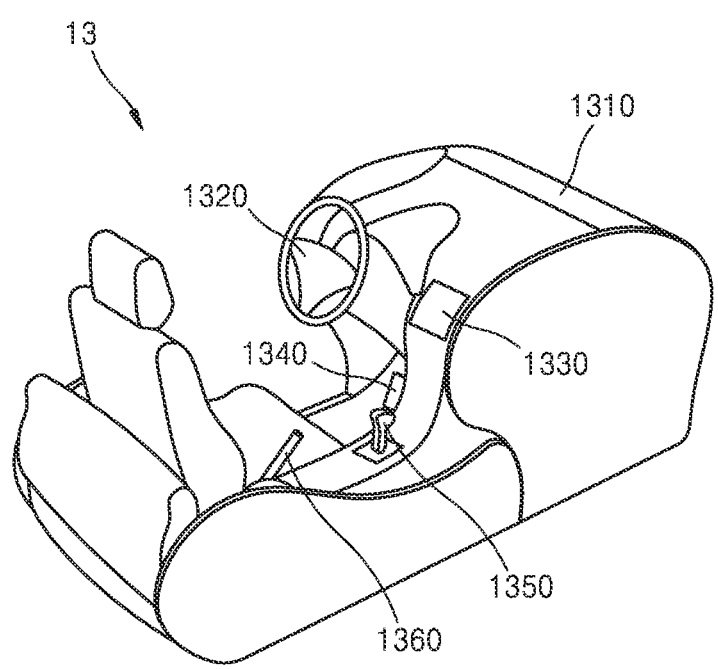
FIG. 2 is a schematic diagram illustrating a main body of a boarding unit shown in FIG. 1.

The main body 13 may include a seat for the passenger to sit and control devices for controlling an overall operation of the boarding unit 10, such as a boarding unit controller 1310 (refer to FIG. 2), a steering device 1320 (refer to FIG. 2), a switch unit 1330 (refer to FIG. 2), and a pedal 1340 (refer to FIG. 2). Components constituting the main body 13 are described later with reference to FIG. 2.

The support unit 15 may be configured to support the boarding display unit 11 and the main body 13 so as to combine them without falling down. In one embodiment, the boarding display unit 11 may be directly fixed to the main body 13, and the support unit 15 may be a support frame for fixing the main body 13. In an embodiment, the support unit 15 may include a driving device for tilting, moving, or vibrating the boarding display unit 11 and/or the main body 13.

The control unit 20 may include a control display 21 and a controller 23.

The control display 21 may include at least one display device. For example, the control display 21 may provide an input/output interface of a simulation program for accident analysis of an autonomous emergency braking device to an operator of the driving simulator 1 for accident analysis of the autonomous emergency braking device. Some display devices of the control display 21 may provide the same image as an image provided by the passenger of the boarding unit 10, or provide a side image of an Ego Vehicle according to a virtual driving scenario. In addition, some display devices of the control display 21 may provide the status and settings of each component of the boarding unit 10 and the control unit 20 to an operator of the driving simulator 1 for accident analysis of the autonomous emergency braking device.

The controller 23 is configured to control an overall operation of the driving simulator 1 for accident analysis of the autonomous emergency braking device, and may include at least one processor or a computing device including at least one processor. In one embodiment, the controller 23 may be driven in a form by being included in another hardware device, such as a microprocessor or general-purpose computer system. In one embodiment, the controller 23 may achieve a desired system performance by using a combination of typical computing devices including a processor, a memory, a storage, etc. with a network device, such as routers, switches, etc., an input device, and/or an output device.

For example, the controller 23 may be configured as a network system to which a plurality of computing devices are connected. The controller 23 may include an image controller 31 (refer to FIG. 3), a sensor controller 33 (refer to FIG. 3), a main controller 35 (refer to FIG. 3) and a simulation controller 37 (refer to FIG. 3) constituting a simulation network 30. Each constituent element of the simulation network 30 are described later in detail with reference to FIG. 3.

FIG. 2 is a schematic diagram illustrating the main body 13 of the boarding unit 10 shown in FIG. 1.

Referring to FIG. 2, the main body 13 of the boarding unit 10 (see FIG. 1) may include the boarding unit controller 1310, the steering device 1320, the switch unit 1330, the pedal 1340, a gear 1350 and a side brake 1360.

The boarding unit controller 1310 may include a data acquisition (DAQ) device for recording and transmitting a reaction of a passenger and a computing device for controlling some operations of the boarding unit 10. The boarding unit controller 1310 1310 may include a network device for connecting the main body 13 and the controller 20 (refer to FIG. 1).

The steering device 1320 may include a steering wheel so that a passenger may acquire an experience similar to driving an actual vehicle. The steering wheel may include a Force Feedback system. For example, the steering wheel may adjust restoring force and resistance of a wheel according to a surrounding environment set in a virtual driving scenario and a speed of the vehicle. In addition, the steering wheel may provide the passenger with an experience similar to driving an actual vehicle by transmitting a feeling of a road surface to the passenger through vibration or the like.

The switch unit 1330 provides an interface for the passenger to set a function of an advanced driver assistance system of the virtual driving vehicle. In an embodiment, the switch unit 1330 may provide an interface through an interface screen of the auxiliary display device attached to the main body 13. In another embodiment, the switch unit 1330 may be provided as a hardware switch.

The pedal 1340, the gear 1350, and the side brake 1360 may be disposed in similar or identical positions to an actual vehicle, and may provide the passenger with an experience similar to operating the actual vehicle. The operation of the passenger using the steering device 1320, the pedal 1340, the gear 1350, and the side brake 1360 is transmitted from the boarding unit controller 1310 to the control unit 20 (refer to FIG. 1) to be reflected in the virtual driving scenario. In addition, the reaction of the passenger may be recorded in real time in the boarding unit controller 1310 and analyzed by the control unit 20 (refer to FIG. 1).

The main body 13 of the boarding unit 10 (refer to FIG. 1) provides an environment similar to the driver's seat of an actual vehicle so that, when a warning signal of the autonomous emergency braking device is output according to a virtual driving scenario, the reaction characteristics of the passenger may be analyzed more closely to an actual situation.

Figure 3:
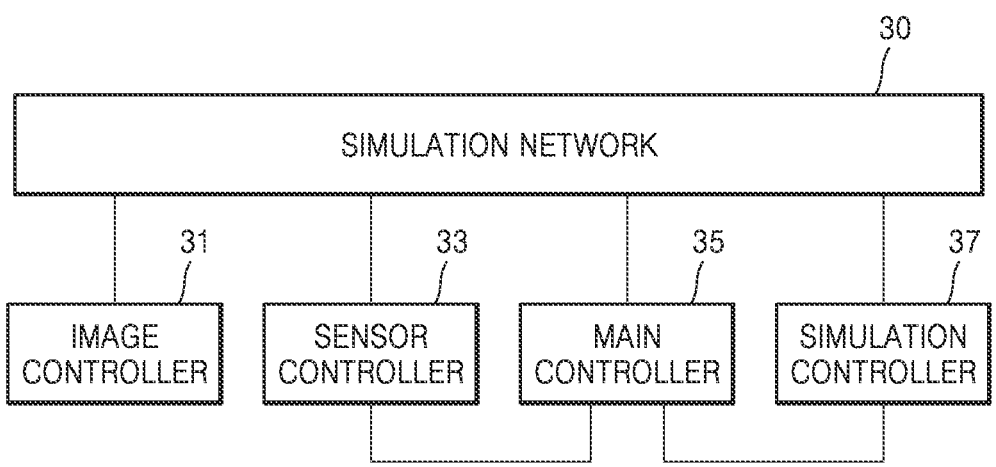
FIG. 3 is a schematic block diagram illustrating a network configuration of a driving simulator for accident analysis of an autonomous emergency braking device according to an embodiment.

FIG. 3 is a schematic block diagram illustrating a configuration of the simulation network 30 of a driving simulator for accident analysis of an autonomous emergency braking device according to an embodiment.

Referring to FIG. 3, the driving simulator 1 (refer to FIG. 1) for analyzing an accident of the autonomous emergency braking device may include the simulation network 30.

The simulation network 30 may include a plurality of computing devices as described above. For example, as shown in FIG. 3, the simulation network 30 may include an image controller 31, a sensor controller 33, a main controller 35, and a simulation controller 37. In this case, each of the image controller 31, the sensor controller 33, the main controller 35, and the simulation controller 37 may be configured as a computing device including independent processors or circuits, but is not limited thereto. For example, some of the image controller 31, the sensor controller 33, the main controller 35, and the simulation controller 37 may be implemented in a programming or scripting language driven in the same computing device.

The image controller 31 may provide an image to the boarding display unit 11 (refer to FIG. 1) and/or the control display 21 (refer to FIG. 1). The image controller 31 may be configured of one or more image modules. For example, when the boarding display unit 11 (refer to FIG. 1) includes a central display device and a first side display device and a second side display device disposed with the central display device therebetween, the image controller 31 may include three image modules corresponding to each of the first side display device and the second side display device. In one embodiment, each of the image modules may be a computing device including an independent processor.

The sensor controller 33 may detect an input of a passenger seating in the boarding unit 10 (refer to FIG. 1) and transmit the input to the main controller 35. For example, the sensor controller 33 may include a control pad module connected to the controllers of the boarding unit 10 and a gateway module for transmitting the input. Also, the sensor controller 33 may include switch software for controlling the switch unit 1330 of the main body 13 (refer to FIG. 2).

The main controller 35 may control an overall operation of the driving simulator 1 (refer to FIG. 1) for accident analysis of the autonomous emergency braking device. For example, the main controller 35 may include a simulation program, a recording module, a scenario module, a traffic tool module, a pedestrian traffic module, and an acoustic module for accident analysis of the autonomous emergency braking device. In one embodiment, the main controller 35 may include cluster software and context-free languages (CFLS) software to transmit an input of the passenger detected by the sensor controller 33 to a simulation program for accident analysis of the autonomous emergency braking device, and to provide a result value to the boarding display unit 11 (refer to FIG. 1) of the boarding unit 10 (refer to FIG. 1), the control display 21 (refer to FIG. 1) of the control unit 20 (refer to FIG. 1), and the steering device 1320, refer to FIG. 2).

The simulation controller 37 may control a simulation program for accident analysis of the autonomous emergency braking device driven by the main controller 35. For example, the simulation controller 37 may include a logic module, a Simulink module, a mode handler module, a traffic module, and a data acquisition module of the autonomous emergency braking device. In an embodiment, the logic module of the autonomous emergency braking device may be an algorithm using a Matlab-based model. In an embodiment, the operator may further add a dynamic model and a virtual driving sequence by adding a logic module compatible with the Simulink module to the simulation controller 37.

Figure 4:
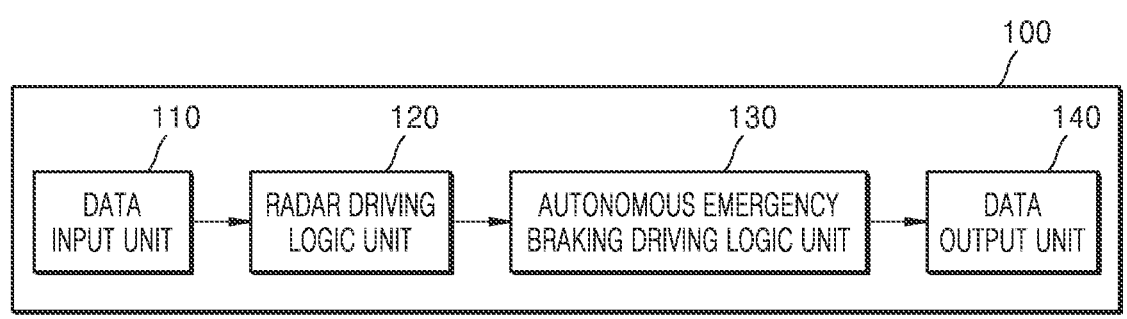
FIG. 4 is a schematic block diagram illustrating a simulation program for accident analysis of an autonomous emergency braking device according to an embodiment.

FIG. 4 is a schematic block diagram illustrating a simulation program 100 for analyzing an accident of an autonomous emergency braking device according to an embodiment.

Referring to FIG. 4, the simulation program 100 for analyzing an accident of an autonomous emergency braking device according to an embodiment includes a data input unit 110, a radar driving logic unit 120, and an autonomous emergency braking driving logic unit 130, and a data output unit 140.

The simulation program 100 for analyzing an accident of the autonomous emergency braking device may set a dynamic model, a simulation program, etc. through the data input unit 110, and may receive virtual driving data including a virtual driving scenario. The virtual driving data may include state data of a driving environment, such as a vehicle type of the virtual driving vehicle (Ego Vehicle), a driving speed, a target location, a target speed, and a curvature and slope of a road. The data input unit 110 may output an operator interface screen to the control display 21 (refer to FIG. 1) of the control unit 20 (refer to FIG. 1), and may receive and store an operator's input. The data input unit 110 may apply a logic and algorithm provided by the simulation controller 37 (refer to FIG. 3) of the control unit 20 (refer to FIG. 1) to the virtual driving scenario.

In some embodiments, the data input unit 110 may download a dynamics model, a simulation program, and/or virtual driving data from an external server through wireless communication, wired communication, or external storage outside the simulation network 30. In some embodiments, the dynamics model and the like may be included in data of the simulation program 100 for accident analysis of the autonomous emergency braking device.

In an embodiment, the virtual driving scenario may include a scenario according to an autonomous emergency braking test protocol. For example, the virtual driving scenario may be a European New Car Assessment Program Autonomous Emergency Braking (Euro NCAP AEB) test protocol scenario. The state data of a target included in the virtual driving data may simulate a Global Vehicle Target (GVT) specified by Euro NCAP and the state data of the driving environment may be a simulation of a Car-to-Car Rear Stationary (CCRs) 100% test environment, but, the present disclosure is not limited thereto, and various changes may be applied to the virtual driving scenario and virtual driving data as needed.

The radar driving logic unit 120 may calculate a relative speed, a relative distance, and an azimuth between a virtual driving vehicle and a target based on the virtual driving data. For example, the radar driving logic unit 120 may generate a virtual radar sensor signal based on the virtual driving data, and may calculate a relative speed, a relative distance, and an azimuth between the virtual driving vehicle and the target by fusion of the virtual radar sensor signal with the camera sensor signal. In an embodiment, the radar driving logic unit 120 may include radar sensor characteristic data according to a vehicle type obtained through an actual test, and may generate a virtual radar sensor signal by reflecting the radar sensor characteristic data.

The autonomous emergency braking driving logic unit 130 may select a sequence of an autonomous emergency braking device applied to a virtual driving vehicle, may output a warning signal to the virtual driving vehicle according to a sequence of the selected autonomous emergency braking device, may apply a virtual braking pressure, and may calculate collision data including a final stopping distance and collision speed by using a vehicle dynamics model.

In one embodiment, the autonomous emergency braking driving logic unit 130 may calculate a time to collision between a virtual driving vehicle and a main target expected to collide based on a relative speed, a relative distance, and an azimuth calculated by the radar driving logic unit 120, and may determine a braking pressure applied to the virtual driving vehicle by comparing the relative speed and the time to collision with execution requirements of the sequence of the autonomous emergency braking device.

Here, the sequence of the autonomous emergency braking device may include a warning operation, a partial braking operation, and a full braking operation. In some embodiments, the partial braking operation may be omitted. The autonomous emergency braking driving logic unit 130 may include autonomous emergency braking actual test data including performance requirement data of a warning operation, a partial braking operation, and a full braking operation according to a relative speed obtained in the actual test of the autonomous emergency braking device of each test vehicle type.

The data output unit 140 may provide simulation values including collision data to an operator and/or a passenger. In an embodiment, the data output unit 140 may transmit the simulation values including collision data to the control display 21 (refer to FIG. 1), the boarding display unit 11 (refer to FIG. 1), or a printing device. In another embodiment, the data output unit 140 may transmit the simulation values to other computing devices through wired/wireless network equipment, such as Ethernet, Wi-Fi chip, Bluetooth chip, wireless communication chip, Near-Field Communication (NFC) chip, and the like.

Figure 5:
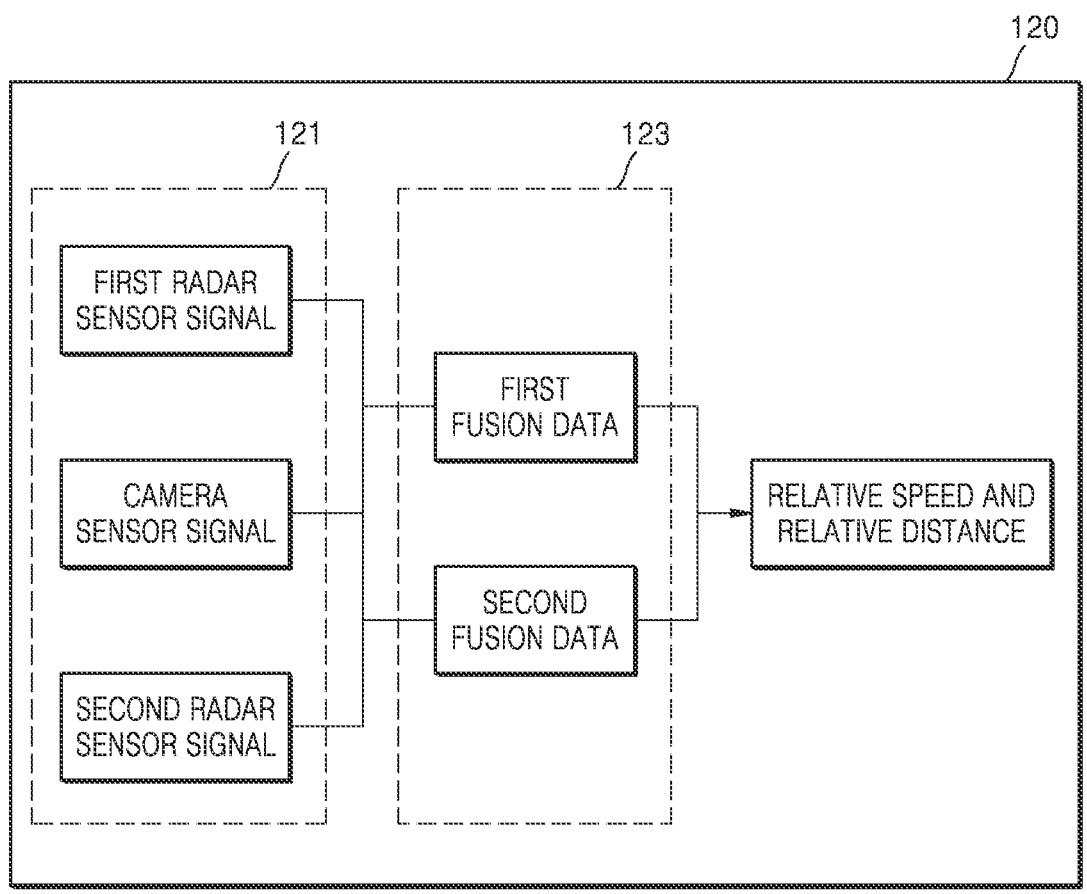
FIG. 5 is a schematic block diagram illustrating a radar driving logic unit of a simulation program for analyzing an accident of the autonomous emergency braking device shown in FIG. 4.

FIG. 5 is a schematic block diagram illustrating a radar driving logic unit of a simulation program for analyzing an accident of the autonomous emergency braking device shown in FIG. 4.

Referring to FIG. 5, the radar driving logic unit 120 may include a signal acquisition unit 121 and a sensor fusion unit 123.

The signal acquisition unit 121 acquires a virtual radar sensor signal and a camera sensor signal from virtual driving data input to the data input unit 110. Here, the radar sensor signal may be calculated from the virtual driving data based on the characteristic data of the radar sensor according to the vehicle type of the virtual driving vehicle.

In one embodiment, the simulation radar sensor signal generated by the radar driving logic unit 120 may be data obtained by receiving an echo signal that is generated by reflecting an emitted electromagnetic wave from an object after emitting the electromagnetic wave in a preset direction from a radar sensor attached to the vehicle.

In relation to the above, in FIG. 2, a situation in which the signal acquisition unit 121 acquires a first radar sensor signal and a second radar sensor signal from the first and second radar sensors located in front of the virtual driving vehicle, respectively, is simulated, but is not limited thereto. Here, the first radar sensor may be a long-range radar sensor, and the second radar sensor may be a mid-range radar sensor.

The type, attachment location, number, and performance of the radar sensor may be different depending on a vehicle type, and in order to reflect these differences, characteristic data of the radar sensor may be obtained through an actual test for each vehicle type, and the characteristic data may be stored in the radar driving logic unit 120. The signal acquisition unit 121 may acquire a virtual radar sensor signal from virtual driving data by reflecting characteristic data of the radar sensor according to the vehicle type of the virtual driving vehicle selected by the user.

In an embodiment, the signal acquisition unit 121 may acquire virtual signals of other sensors, such as a Light Detection and Ranging (LiDAR) sensor or an ultrasonic sensor.

The sensor fusion unit 123 may acquire fusion data by sensor fusion of a camera sensor signal and a radar sensor signal. In an embodiment, the sensor fusion unit 123 may include a sensor fusion algorithm that uses a Kalman filter.

The sensor fusion unit 123 may acquire first fusion data for targets located in a long-range by fusing a first radar sensor signal and a camera sensor signal, and acquire second fusion data for targets located in a mid-range by fusing the second radar sensor signal and the camera sensor signal. The sensor fusion unit 123 may acquire a relative speed, a relative distance and an azimuth of the targets within a field of view from the first fusion data and the second fusion data.

Figure 6:
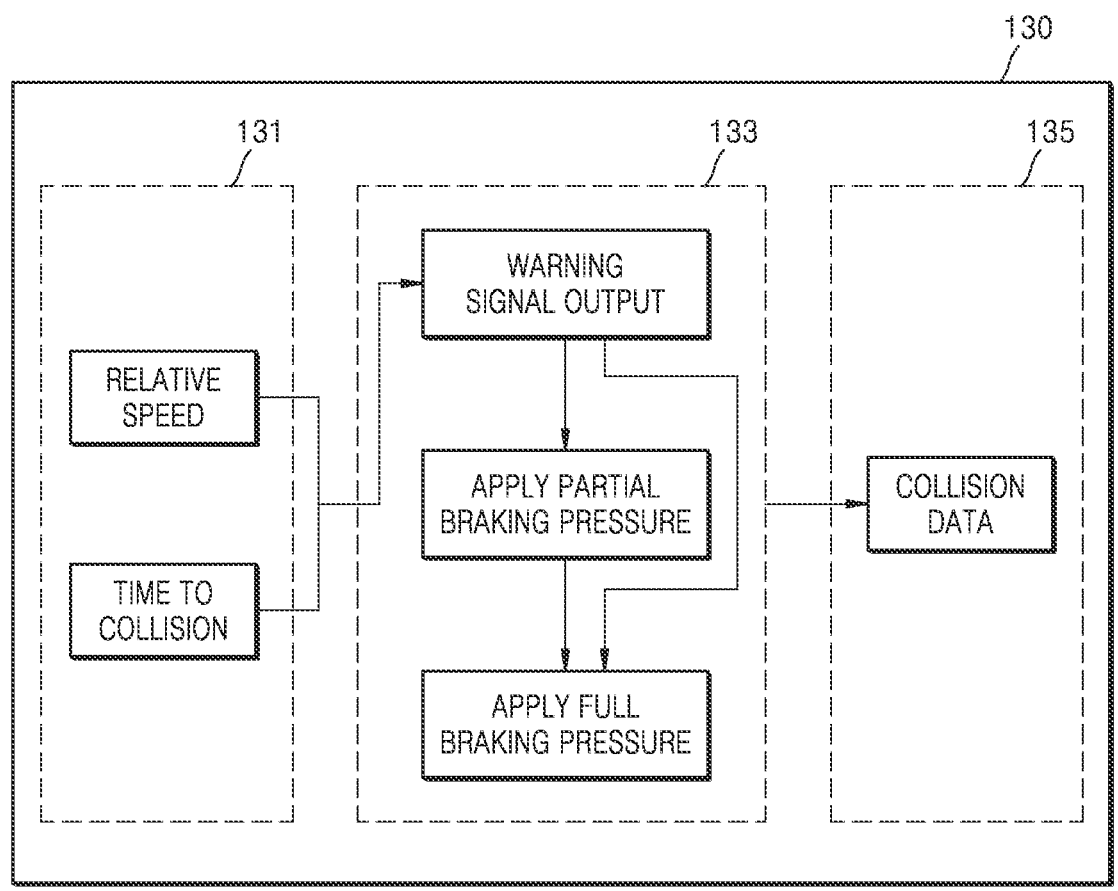
FIG. 6 is a schematic block diagram illustrating an autonomous emergency braking driving logic unit of a simulation program for analyzing an accident of the autonomous emergency braking device shown in FIG. 4.

FIG. 6 is a schematic block diagram illustrating an autonomous emergency braking driving logic unit 130 of a simulation program for analyzing an accident of the autonomous emergency braking device shown in FIG. 4.

Referring to FIG. 6, the autonomous emergency braking driving logic unit 130 may include a calculation unit 131, a braking operation unit 133, and a collision data calculation unit 135.

First, the autonomous emergency braking driving logic unit 130 may select a main target (the most important object) with a potential for collision from data, such as a relative speed, a relative distance, and an azimuth of targets output by the radar driving logic unit 120, and may calculate a time to collision of the main target with the virtual driving vehicle.

A formula for calculating a time to collision is as Equation 1 below.

$$TTC(\text{sec}) = \frac{\text{relative distance (m)}}{\text{relative speed (m/sec)}} \quad [\text{Equation 1}]$$

The performance requirements of each sequence of an autonomous emergency braking device are based on a time to collision rather than a simple operation time, and the braking operation unit 133 may select a sequence of the autonomous emergency braking device to be applied to the virtual driving vehicle by using input variables, such as a time to collision and a relative speed calculated by the calculation unit 131.

In an embodiment, the braking operation unit 133 may include autonomous emergency braking actual test data for a plurality of vehicle types. The autonomous emergency braking actual test data for a plurality of vehicle types may be obtained through a collision test using a test vehicle. The autonomous emergency braking actual test data may include performance requirements of each autonomous emergency braking sequence with respect to a time to collision and a relative speed.

The braking operation unit 133 may compare actual autonomous emergency braking test data for each vehicle type obtained through the actual test with a time to collision and a relative speed obtained by the operation unit 131 to output a warning signal to the virtual driving vehicle or apply braking pressure. In an embodiment, when the braking operation unit 133 outputs a warning signal, a warning may be output on the instrument panel display of the boarding unit 10 (refer to FIG. 1). In an embodiment, when the braking operation unit 133 outputs a warning signal, an acoustic output device of the boarding unit 10 (refer to FIG. 1) may output a warning signal.

For example, the braking operation unit 133 may load autonomous emergency braking test data for the same vehicle type as that of the virtual driving vehicle selected by the data input unit 110, and compare the relative speed and the time to collision of the main target obtained by the operation unit 131 with the autonomous emergency braking actual test data to determine a sequence of the autonomous emergency braking device applied to a virtual driving vehicle.

An operation sequence of the autonomous emergency braking device may include a forward collision warning, a partial braking operation, and a full braking operation, and performance requirements for the operation sequence may be different depending on the vehicle type. Each operation may be performed sequentially, but some operations may be omitted. For example, the braking operation unit 133 may compare a relative speed and a time to collision between a virtual driving vehicle and a main target with the autonomous emergency braking actual test data so that a warning operation, a partial braking operation, and a full braking operation may be sequentially carried out according to a certain sequence. In this case, a warning signal may be output to the virtual driving vehicle when a performance requirement of the warning operation is satisfied, a partial braking pressure may be applied to the virtual driving vehicle when a performance requirement of the partial braking operation is satisfied, and a maximum braking pressure may be applied to the virtual driving vehicle when a performance requirement of the full braking operation is satisfied. In the case of a vehicle type in which the partial braking operation is omitted, a maximum braking pressure may be applied immediately after the output of a warning signal. In addition, if a time to collision between a virtual driving vehicle and a main target is the same as or less than the time to collision that satisfies a full braking operation performance requirement in autonomous emergency braking actual test data, the braking operation unit 133 may omit a partial braking operation and apply a maximum braking pressure to the virtual driving vehicle.

The collision data calculation unit 135 may calculate collision data based on a braking pressure applied to the virtual driving vehicle, a relative distance, a relative speed, an azimuth, and state data of a driving environment according to a dynamics model or the like. The collision data may include values of a final stopping distance of the virtual driving vehicle, whether the vehicle collides with a target, and a collision speed.

Figure 7:
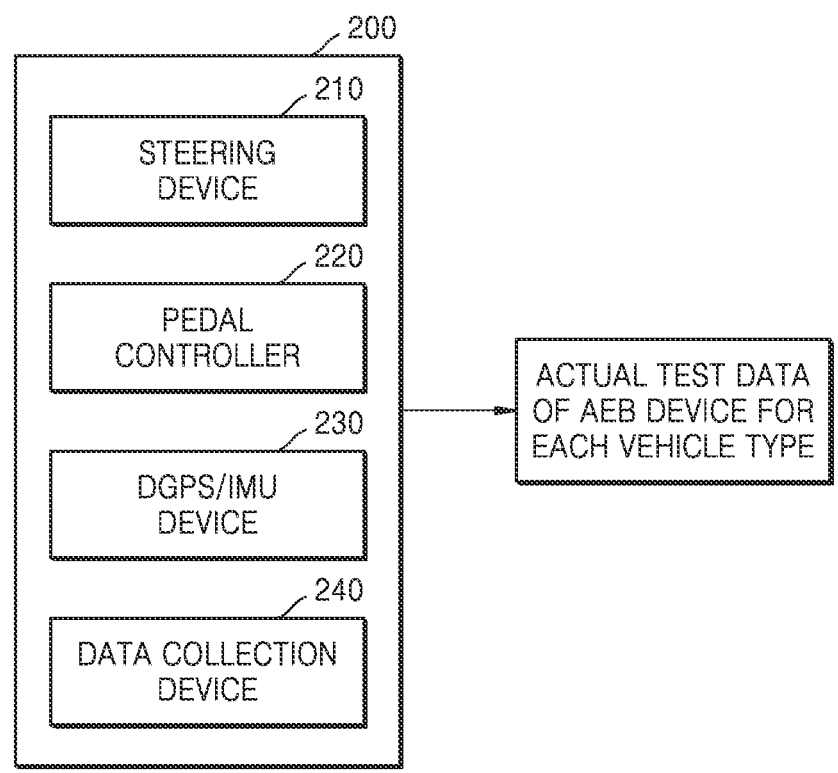
FIG. 7 is a schematic diagram illustrating a test vehicle for acquiring actual test data of an autonomous emergency braking device according to an embodiment.

FIG. 7 is a schematic diagram illustrating a test vehicle 200 for acquiring actual test data of an autonomous emergency braking device according to an embodiment.

Referring to FIG. 7, in order to obtain autonomous emergency braking actual test data, an experiment may be performed to satisfy the criteria of Euro NCAP's AEB C2C Test protocol, and the test vehicle 200 may be selected from a vehicle type that is actually sold. The experimental vehicle 200 may include an experimental steering device 210, a pedal controller 220, a Differential Global Positioning System/Inertial Measurement Unit (DGPS/IMU) device 230, and a data collection device 240.

In order to satisfy a EuroNCAP AEB test standard, the test vehicle 200 may control a GPS-based speed and an overlap with a target by using the experimental steering device 210 and the pedal controller 220. In some embodiments, in order to obtain more precise GPS data, the test vehicle 200 may include the DGPS/IMU device 230. Experimental data acquired by the experimental vehicle 200 and the target may be acquired by using the data collection device 240 mounted inside the experimental vehicle 200.

An actual performance requirement of an autonomous emergency braking sequence may be different from a manual provided by the vehicle manufacturer, so it is difficult to apply the manual as it is when analyzing and simulating a traffic accident of a vehicle equipped with an autonomous emergency braking device. Accordingly, in the embodiments of the present disclosure, collision data is calculated by using autonomous emergency braking actual test data obtained through an actual test using the experimental vehicle 200, thus, a simulation program for accident analysis of an autonomous emergency braking device further similar to an actual vehicle may be implemented.

Figure 8:
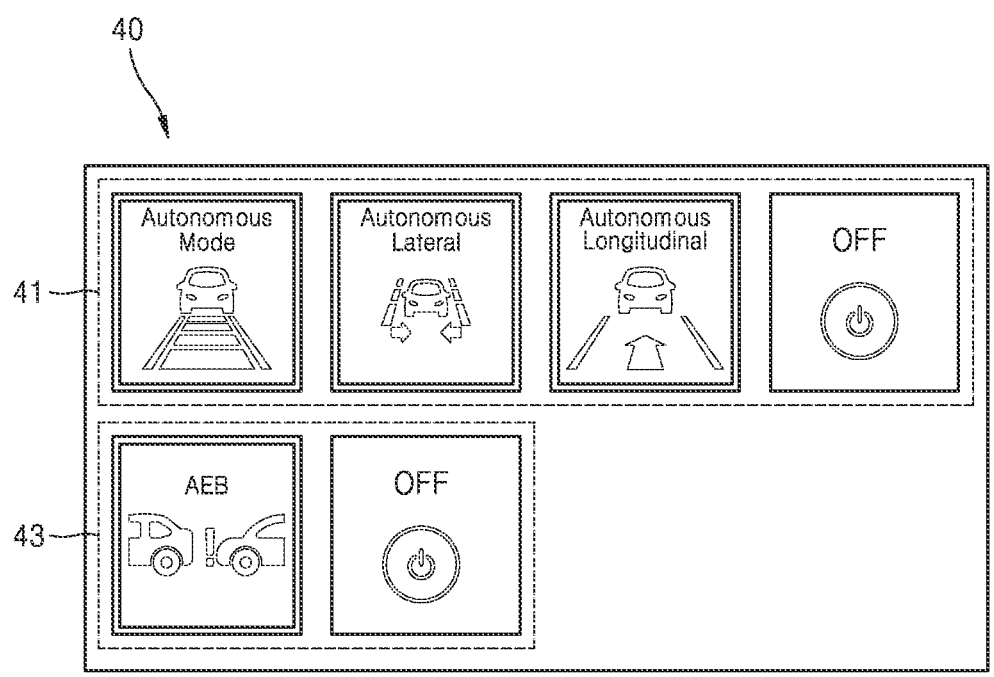
FIG. 8 is a schematic diagram illustrating an auxiliary display screen of a driving simulator for accident analysis of an autonomous emergency braking device according to an embodiment.

FIG. 8 is a schematic diagram illustrating an auxiliary display screen 40 of the driving simulator 1 (refer to FIG. 1) for accident analysis of an autonomous emergency braking device according to an embodiment. The auxiliary display screen 40 may have the same configuration as the switch unit 1330 (refer to FIG. 2) for setting functions of the advanced driver assistance system (ADAS).

The auxiliary display screen 40 may include an autonomous driving mode setting switch unit 41 and an autonomous emergency braking setting switch unit 43.

The autonomous driving mode setting switch unit 41 may select any one of an autonomous mode that controls both a longitudinal speed and a lateral steering of a virtual driving vehicle, an autonomous lateral mode in which a lateral steering is controlled and a longitudinal speed is controlled by a passenger with an accelerator or a brake pedal, and an autonomous longitudinal mode in which a passenger manipulates a travel path of the vehicle with a steering device and a longitudinal speed is controlled.

The autonomous emergency braking setting switch unit 43 may turn on or off the function of the autonomous emergency braking device.

As described above, the auxiliary display screen 40 is configured in the same or similar shape as a driver's seat of an actual vehicle so that a passenger may select various options of the ADAS.

Figure 9:
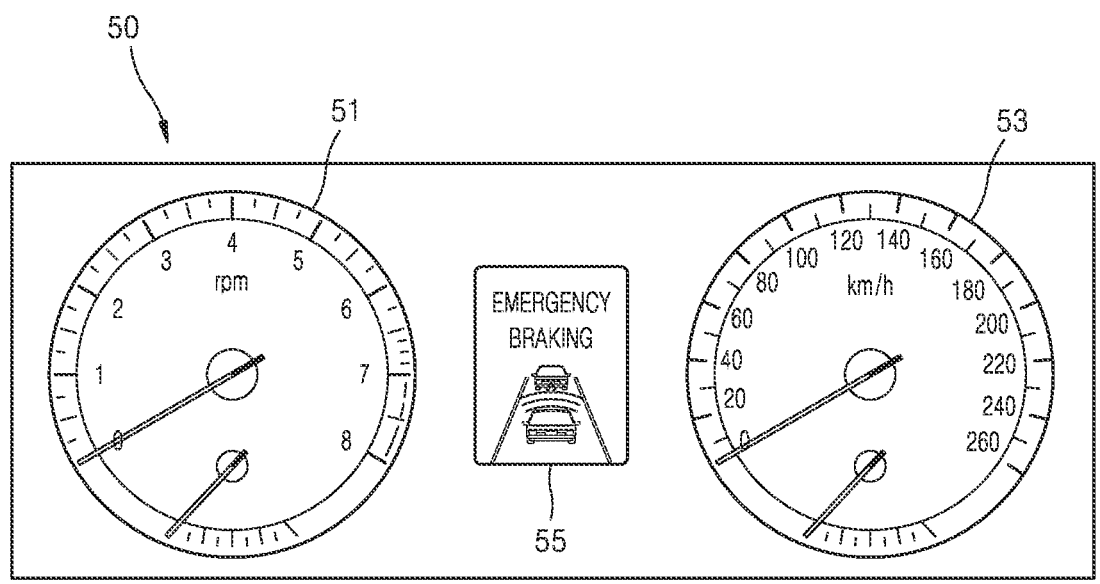
FIG. 9 is a schematic diagram illustrating an instrument panel display screen of a driving simulator for analyzing an accident of an autonomous emergency braking device according to an embodiment.

FIG. 9 is a schematic diagram illustrating an instrument panel display screen 50 of the driving simulator 1 (refer to FIG. 1) for analyzing an accident of an autonomous emergency braking device according to an embodiment.

Referring to FIG. 9, the instrument panel display screen 50 includes an RPM instrument panel 51 that displays an engine rotation speed, a speed instrument panel 53 that displays a speed of the virtual driving vehicle, and a warning signal 55 of the autonomous emergency braking device.

The instrument panel display screen 50 may be disposed on an instrument panel behind the steering device 1320 (refer to FIG. 2) of the boarding unit 10 (refer to FIG. 1) as in an actual vehicle. The warning signal 55 of the autonomous emergency braking device may be displayed when a warning signal is output by performing a warning operation in the simulation program for accident analysis of the autonomous emergency braking device described above, and may not be displayed in other cases.

When the warning signal 55 of the autonomous emergency braking device is displayed, an acoustic output device of the boarding unit 10 (refer to FIG. 1) may simultaneously output the warning signal. Accordingly, the passenger may respond to a similar situation simulating a case in which an autonomous emergency braking device of an actual vehicle outputs a warning signal, and thus, the same or a similar reaction of a passenger's reaction in an actual accident may be shown. Accordingly, more precise accident analysis and accident reproduction of a vehicle equipped with an ADAS may be possible.

According to an embodiment of the present disclosure described above, a driving simulator for accident analysis of an autonomous emergency braking device for accident analysis and accident reproduction of a vehicle equipped with an ADAS may be implemented. Of course, the scope of the present disclosure is not limited by these effects.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A driving simulator for accident analysis of an autonomous emergency braking device, the driving simulator comprising:

a boarding unit including:
   a boarding display unit for providing a virtual driving image;
   a main body for accommodating a passenger and operating a virtual driving vehicle;
   a support unit for supporting the boarding display unit and the main body;
   an acoustic output device; and
   an auxiliary display unit mounted on the main body; and a control unit including: a controller configured to run a simulation program for accident analysis of the autonomous emergency braking device and control the boarding unit; and a control display unit configured to provide an operator interface screen of the simulation program for accident analysis of the autonomous emergency braking device, wherein the simulation program for accident analysis of the autonomous emergency braking device includes;
   an autonomous emergency braking driving logic unit configured to output a warning signal to the boarding unit according to a sequence of the autonomous emergency braking device or apply a virtual braking pressure to the virtual driving vehicle, calculate collision data including a final stopping distance, a collision speed, and a time to collision from a relative speed and a relative distance between the virtual driving vehicle and a target, and display the collision data on the control display unit; and
   a braking operation unit configured to compare the relative speed and the time to collision with actual test data of the autonomous emergency braking device, output an image warning signal to the auxiliary display unit, and output a warning signal sound to the acoustic output device when the virtual driving vehicle satisfies a performance requirement for a warning operation, the actual test data of the autonomous emergency braking device includes a performance requirement for a warning operation, a partial braking operation, and a full braking operation according to the relative speed obtained in an operation experiment with a stop target of an autonomous emergency braking device of a test vehicle equipped with a Differential Global Positioning System (DGPS) device and an inertial measurement unit (IMU) device.

2. The driving simulator of claim 1, wherein
the simulation program for accident analysis of the autonomous emergency braking device further includes a radar driving logic unit configured to
acquire a first radar sensor signal, a second radar sensor signal, and a camera sensor signal from virtual driving data including state data of the virtual driving vehicle, a target, and a driving environment,
acquire first fusion data and second fusion data by combining each of the first radar sensor signal and the second radar sensor signal with the camera sensor signal, and
calculate the relative speed, the relative distance, and an azimuth between the virtual driving vehicle and the target based on the first fusion data and the second fusion data.

3. The driving simulator of claim 2, wherein the radar driving logic unit includes radar sensor characteristic data according to a vehicle type of the virtual driving vehicle.

4. The driving simulator of claim 1, wherein
the autonomous emergency braking driving logic unit includes actual test data of the autonomous emergency braking device for a plurality of vehicle types, and is further configured to select actual test data of the autonomous emergency braking device corresponding to a vehicle type of the virtual driving vehicle, and
the actual test data of the autonomous emergency braking device includes a value of time to collision according to a relative speed at which a warning operation, a partial braking operation, and a full braking operation are started, which are obtained through the actual test.

5. The driving simulator of claim 1, wherein the boarding unit further includes a data acquisition device configured to record a reaction of the passenger and transmit the recorded data to the control unit.

6. The driving simulator of claim 1, wherein the boarding unit further includes a switch unit configured to allow the passenger to set a driving mode of the virtual driving vehicle and whether to operate the autonomous emergency braking device.

7. The driving simulator of claim 1, wherein the boarding display unit includes a central display device attached to the boarding display unit in front of the passenger and a first side display device and a second side display device respectively attached to both sides of the central display device.

8. The driving simulator of claim 1, wherein the main body includes a steering device, a pedal, a gear, and a side brake.

* * * * *